United States Patent
Mittal et al.

(10) Patent No.: US 9,842,184 B2
(45) Date of Patent: Dec. 12, 2017

(54) METHOD, APPARATUS AND SYSTEM FOR USING HYBRID LIBRARY TRACK DESIGN FOR SOI TECHNOLOGY

(71) Applicant: GLOBALFOUNDRIES INC., Grand Cayman (KY)

(72) Inventors: Anurag Mittal, Saratoga Springs, NY (US); Mahbub Rashed, Santa Clara, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 49 days.

(21) Appl. No.: 15/047,878

(22) Filed: Feb. 19, 2016

(65) Prior Publication Data

US 2017/0076031 A1    Mar. 16, 2017

Related U.S. Application Data

(60) Provisional application No. 62/217,391, filed on Sep. 11, 2015.

(51) Int. Cl.

| G06F 17/50 | (2006.01) |
|---|---|
| H01L 23/00 | (2006.01) |
| H01L 27/00 | (2006.01) |
| H01L 27/12 | (2006.01) |
| H01L 27/02 | (2006.01) |
| H01L 23/528 | (2006.01) |

(52) U.S. Cl.
CPC ...... *G06F 17/5072* (2013.01); *G06F 17/5077* (2013.01); *G06F 17/5081* (2013.01); *H01L 23/528* (2013.01); *H01L 27/0207* (2013.01); *H01L 27/1203* (2013.01)

(58) Field of Classification Search
CPC ............ G06F 17/5072; G06F 17/5077; G06F 17/5081; H01L 23/528; H01L 27/0207; H01L 27/1203
See application file for complete search history.

(56) References Cited

U.S. PATENT DOCUMENTS

| 4,254,427 A | * | 3/1981 | Lohstroh | ................ G11C 17/16 257/497 |
|---|---|---|---|---|
| 7,882,476 B2 | * | 2/2011 | Itaka | ................... G06F 17/5068 257/202 |
| 8,443,306 B1 | | 5/2013 | Dhong et al. | |
| 8,482,070 B1 | * | 7/2013 | Flatresse | ............. H01L 21/8228 257/351 |
| 8,522,188 B2 | * | 8/2013 | Kim | .................... G06F 17/5031 714/700 |
| 8,937,505 B2 | * | 1/2015 | Giraud | .................... H01L 21/84 327/534 |

(Continued)

*Primary Examiner* — Stacy Whitmore
(74) *Attorney, Agent, or Firm* — Williams Morgan, P.C.

(57) ABSTRACT

At least one method, apparatus and system disclosed involves providing a design for manufacturing a semiconductor device. A first functional cell having a first width is placed on a circuit layout. A determination is made as to whether at least one transistor of the first functional cell is to be forward biased or reversed biased. A second functional cell having a second width is placed adjacent to the first functional cell on the circuit layout for providing a first biasing well within the total width of the first and second functional cells in response to determining that the at least one transistor is to be forward biased or reversed biased.

16 Claims, 9 Drawing Sheets

(56) References Cited

U.S. PATENT DOCUMENTS

| | | | | |
|---|---|---|---|---|
| 9,479,168 B2* | 10/2016 | Giraud | | H03K 19/0016 |
| 2007/0029621 A1* | 2/2007 | Tatsumi | | H01L 27/11807 |
| | | | | 257/371 |
| 2011/0299327 A1* | 12/2011 | Asa | | G11C 11/411 |
| | | | | 365/156 |
| 2012/0126333 A1 | 5/2012 | Thomas et al. | | |
| 2013/0157451 A1* | 6/2013 | Lin | | G06F 17/5081 |
| | | | | 438/587 |
| 2013/0214433 A1* | 8/2013 | Penzes | | H01L 27/0207 |
| | | | | 257/786 |
| 2013/0313615 A1* | 11/2013 | Tzeng | | H01L 27/0207 |
| | | | | 257/206 |
| 2014/0077300 A1 | 3/2014 | Noel et al. | | |
| 2014/0115553 A1* | 4/2014 | Lee | | G06F 17/5072 |
| | | | | 716/119 |
| 2014/0167117 A1* | 6/2014 | Quandt | | H01L 27/0207 |
| | | | | 257/202 |
| 2014/0346662 A1* | 11/2014 | Rashed | | G06F 17/5072 |
| | | | | 257/734 |
| 2015/0287722 A1* | 10/2015 | Giraud | | H01L 27/092 |
| | | | | 257/348 |
| 2016/0086932 A1* | 3/2016 | Chen | | H01L 27/0207 |
| | | | | 257/369 |
| 2016/0321389 A1* | 11/2016 | Myers | | G06F 17/5077 |
| 2017/0062404 A1* | 3/2017 | Frederick, Jr. | | G06F 17/5077 |
| 2017/0104004 A1* | 4/2017 | Quandt | | H01L 27/11803 |

* cited by examiner

METHOD, APPARATUS AND SYSTEM FOR USING HYBRID LIBRARY TRACK DESIGN FOR SOI TECHNOLOGY

FIELD OF THE INVENTION

Generally, the present disclosure relates to the manufacture of sophisticated semiconductor devices, and, more specifically, to employing hybrid library track design for SOI technology.

DESCRIPTION OF THE RELATED ART

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a plurality of process technologies are currently practiced, wherein, for many types of complex circuitry, including field effect transistors, MOS technology is currently among the most promising approaches due to the superior characteristics in view of operating speed and/or power consumption and/or cost efficiency. During the fabrication of complex integrated circuits using, for instance, MOS technology, millions of transistors, e.g., N-channel transistors and/or P-channel transistors, are formed on a substrate including a crystalline semiconductor layer. During fabrication of N-channel MOS (NMOS) devices and/or P-channel MOS (PMOS) devices, designers often control process steps to allow for increase current drive of those devices. For NMOS devices, the flow of electrons may be enhanced for increased current drive. For PMOS devices, the flow of "holes" may be enhanced for increased current drive. For example, a strained silicon layer is often formed to provide for improved transport of charge particles (i.e., electrons or holes).

There is a growing consensus in the industry that traditional methodology must be improved upon to provide smaller devices and devices that can operate at lower voltages. Currently, so-called bulk FETs are one of the more popular designs implemented in many devices. FIG. 1 illustrates a stylized depiction of a typical bulk FET 100 formed on a semiconductor wafer. The FET 100 is formed on a silicon substrate 105. An inversion layer 150 is formed on the silicon substrate 105. The inversion layer 150 is generally formed by depositing silicon oxide. A gate 100 is formed on the substrate 105, surrounded by insulation 120 formed during the processing of the wafer, which may be comprised of $HfO_2$.

A gate oxide layer 125 is formed over the inversion layer 150. The gate 120 of the FET 100 is formed over the gate oxide layer 125. FIG. 1 also illustrates the source region 140 and the drain region 130, which are formed at the top portion of the substrate 105. If the substrate 105 is of N-type, the drain and source regions 130, 140 would be of P-type, and vice versa. In this configuration, a depletion region 160 is created below the source region 140 and the drain region 130.

One of the problems associated with the typical bulk FET design of FIG. 1 includes the fact that these types of FETs can exhibit significant parasitic capacitance, leading to performance degradation and power loss. Further, due to the depletion region 160, current leakage may occur even when the FET 100 is off. Current leakage may include drain leakage current, source leakage current, and well leakage current. The FET 100 also tends to have a relatively high threshold voltage. Moreover, when supply voltage is reduced in order to decrease power consumption, the typical bulk FET design of FIG. 1 tends to exhibit performance degradation.

Designers have suggested utilizing the so-called silicon-on-insulator (SOI) design to address some of the deficiencies and problems exhibited by the typical bulk FET design of FIG. 1. SOI transistors are generally formed in thin layers of silicon that are isolated from the main substrate of a semiconductor wafer by using an electrical insulator, such silicon dioxide. The thin silicon layers may have thicknesses that range from several microns (typically for electrical power switching devices) down to less than 500 Å (typically for high-performance microprocessors). The isolation properties conferred by SOI designs provides for a reduction in the current leakage. SOI designs can provide other advantages such as faster operation of circuits and lower operating voltages. FIG. 2 illustrates a stylized depiction of a typical fully depleted (FD) SOI FET 200 formed on a semiconductor wafer.

The FD-SOI FET 200 is formed on a silicon substrate 205. The FET 200 comprises a depletion region 250 formed by depositing silicon oxide. A gate 200 is formed on the substrate 205, surrounded by insulation 220 formed during the processing of the wafer, and is generally comprised of $HfO_2$.

A gate oxide layer 225 is formed over substrate 205. The gate 220 of the FET 220 is formed over the gate oxide layer 225. The FET 200 also comprises a source region 240 and the drain region 240, which are formed at the top of the substrate 105. If the substrate 205 is of N-type, the drain and source regions 230, 240 would be of P-type, and vice versa. Further, the FET 200 comprises a buried oxide (BOX) region 270 below the drain and source regions 230, 240.

In this configuration, instead of a large depletion region 160 of FIG. 1, the depletion region 250 is confined above the BOX region 270 and between the drain and source regions 230, 240. The BOX region 270 is formed below the source region 140, the drain region 130 and the depletion region 250. The position of the BOX region 270 prevents the formation of a large depletion region similar to the depletion region 160 of FIG. 1. Further, the depletion region 250, in this case, is fully depleted. If the drain and source regions 230, 240 are of P-type, the depletion region 250 would be an N-type depleted region, and vice versa.

Further, FD-SOI FETs may be configured into a so-called LVT/SLVT format where a transistor pair comprises an NMOS FET formed over an N-well and a PMOS FET formed over a P-well, also referred to as flip-well configuration. Still further, FD-SOI FETs may be configured into a so-called RVT/HVT format, where a transistor pair comprises an NMOS FET formed over a P-well and a PMOS FET formed over an N-well. These configurations are described below.

One of the advantages of the FD SOI FET design is reduced threshold voltages, which allows for lower operating voltages. Other advantages include lower parasitic capacitance and lower leakage currents. However, one of the problems associated with the FD SOI FET and other technologies is that upon application of lower operating voltages, low $V_{dd}$ timing violations may occur. In order to address timing errors, designers have resorted to providing targeted biasing voltages, i.e., forward biasing voltages for flip well (LSVT/LVT) configurations, and reverse biasing voltages for conventional well (RVT/HVT) configurations.

FIG. 3 illustrates a stylized depiction a typical transistor pair 400 formed in a LVT/SLVT configuration. FIG. 4 illustrates a stylized depiction of typical transistor pair 500 formed in an RVT/HVT configuration. Referring simultaneously to FIGS. 3 and 4, a transistor pair 300 (FIG. 4) comprises an NFET 301 and a PFET 302. FIG. 4 illustrates a transistor pair 400, which also comprises an NFET 401 and a PFET 402.

With regard to the transistor pair 300, the NFET 301 is formed on an N-well 375A, and comprises a gate 320A, a drain region 330A, and a source region 340A. The PFET 302 is formed on a P-well 375B, and comprises a gate 320B, a drain region 330B, and a source region 340B. The NFET 301 and PFET 302 are separated by a shallow trench isolation (STI) region 380.

The NFET 301 is formed over a BOX region 370A and the PFET 302 is formed over a BOX region 370B. The NFET 301 and PFET 302 respectively comprise fully depleted regions 350A and 350B. The fully depleted regions 350A, 350B are respectively located above the BOX regions 370A, 370B and between the source and drain regions of the FETs 301, 302.

With regard to the transistor pair 400, the NFET 401 is formed on a P-well 475A, and comprises a gate 420A, a drain region 430A, and a source region 440A. The PFET 402 is formed on a P-well 475B, and comprises a gate 420B, a drain region 430B, and a source region 440B. The NFET 401 and PFET 402 are separated by a shallow trench isolation (STI) region 480.

The NFET 401 is formed over a BOX region 470A and the PFET 440B is formed over a BOX region 470B. The NFET 402 and PFET 440B respectively comprise fully depleted regions 450A and 450B. The fully depleted regions 450A, 450B are located above the BOX regions 470A, 470B and between the source and drain regions of the FETs 401, 402.

As indicated in FIGS. 3 and 4, the LVT/SLVT FETs 301, 302 are capable of being forward biased, wherein the RVT/HVT FETs 401, 402 are capable of being reversed biased. In order to adjust for any timing issues resulting from operation of the FD SOI FETs (e.g., timing errors due to low Vdd), designers have introduced forward or reverse biasing schemes. However, state of the art forward/reverse biasing schemes require timing adjustments, such as insertion of delay buffers.

When designing a layout of various devices with an integrated circuits (e.g., CMOS logic architecture), designers often select pre-designed functional cells comprising various features (e.g., diffusion regions, transistors, metal lines, vias, etc.) and place them strategically to provide active circuitry in an integrated circuit device. These cells may comprise various components, such as transistors, metal power strips, etc. These cells are arranged in a predetermined architecture that defines the cell alignment and locations of metal tracks for carrying large voltage signals (e.g., power signals, etc.).

Moreover, components in these cells are generally comprised of homogenous technology. For example, in a typical SOI CMOS logic architecture, each cell may comprise either LVT/SLVT FETs or RVT/HVT FETs, but not both unless isolation wells are used, leading to significant area penalty. In this architecture, cells comprised of LVT/SLVT FETs cannot be arranged adjacent to RVT/HVT FETs without an area penalty In order to use both LVT/SLVT FETs cells and RVT/HVT FETs cells in a block, a region for separating the wells corresponding to the different biasing regions must be placed between LVT/SLVT FETs cells and the RVT/HVT FETs cells. This results in excessive area penalties and other inefficiencies in the design and operation of integrated circuits.

Further, designers have implemented biasing voltages to the FD SOI FETs to adjust for critical path delays or to increase performance of sections of devices. However, producing the necessary voltage signals, e.g., using voltage dividers, regulators, etc., can be costly in terms of power consumption and area utilization on a semiconductor wafer. Further, routing the biasing voltages may be difficult in dense circuits. Moreover, the state of the art is directed to biasing entire blocks of FETs, which causes significant current leakage.

Accordingly, biasing cells containing SOI FETs can become problematic. State of the art requires inefficient usage of well space to be used to selectively bias cells within a block. Even then, the state of the art generally allows for only block level, or sections of fewer granularities, to be biased for reduction of current leakage and/or increasing drive and other performance metrics of a circuit. These issues are described in FIGS. 5 and 6 below.

Turning now to FIG. 5, a typical block of functional cells comprising a bias well is illustrated. Typically, a plurality of functional cells may be arranged on a track to form a block, such as a block 500 of FIG. 5. A $1^{st}$ cell row 510 may be formed by arranging one or more cells of a predetermined width (e.g., 9-track [9T]) onto a circuit layout. A $2^{nd}$ cell row 520 may be similarly arranged adjacent the $1^{st}$ cell row 510. If it is desired that a bias routing signal is to be provided to the $2^{nd}$ row, a bias well 530 is created on the track of the block 500. The bias signal is then routed in the bias well 530. Adjacent the bias well 530, a $3^{rd}$ cell row 540 and a $4^{th}$ cell row 550 are arranged to form the block 500. This arrangement can cause excessive utilization of space, causing unacceptable area overhead.

As such, in many cases, in state of the art designs, block level biasing is applied in order to avoid the large are overhead illustrated in FIG. 5. However, block level biasing can cause increased current leakage and may inadvertently forward bias unintended transistors, and/or interfere with the necessary reverse biasing of other transistors.

Turning now to FIG. 6, a typical block of functional cells comprising an isolation spacing is illustrated. A $1^{st}$ cell row 610 and a $2^{nd}$ cell row 620 are arranged adjacent each other in a block 600. The $1^{st}$ and $2^{nd}$ cell rows 610, 620 are of a $1^{st}$ type of SOI devices, such as LVT/SLVT devices. As it is well known, different types of SOI devices may not be generally arranged adjacent each other. For example, an RVT/HVT functional cell cannot be arranged adjacent LVT/SLVT cells. Therefore, isolation spacing must be formed between different types of SOI devices.

Accordingly, an isolation spacer 660 is formed on a track of the block 600. The isolation spacer 660 provides the necessary isolation from the LVT/SLVT functional cells to form RVT/HVT functional cells. Therefore, cells of different device types, i.e., the $3^{rd}$ cell row 630, the $4^{th}$ cell row 640, and the $5^{th}$ cell row 650, are formed below the isolation spacer 660. In this manner, the different types of SOI devices are separated within the block. This arrangement can also cause excessive utilization of space, causing unacceptable area overhead.

The present disclosure may address and/or at least reduce one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to at least one method, apparatus and system disclosed involves providing a design for manufacturing a semiconductor device. A first functional cell having a first width is placed on a circuit layout. A determination is made as to whether at least one transistor of the first functional cell is to be forward biased or reversed biased. A second functional cell having a second width is placed adjacent to the first functional cell on the circuit layout for providing a first biasing well within the total width of the first and second functional cells in response to determining that the at least one transistor is to be forward biased or reversed biased.

BRIEF DESCRIPTION OF THE DRAWINGS

The disclosure may be understood by reference to the following description taken in conjunction with the accompanying drawings, in which like reference numerals identify like elements, and in which.

Figure 1:
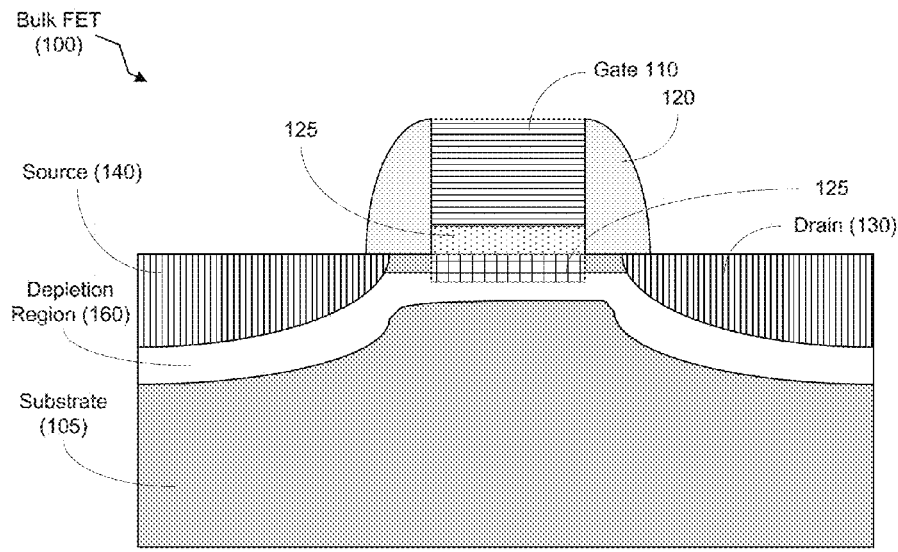
FIG. 1 illustrates a stylized depiction of a typical bulk FET formed on a semiconductor wafer.
Figure 2:
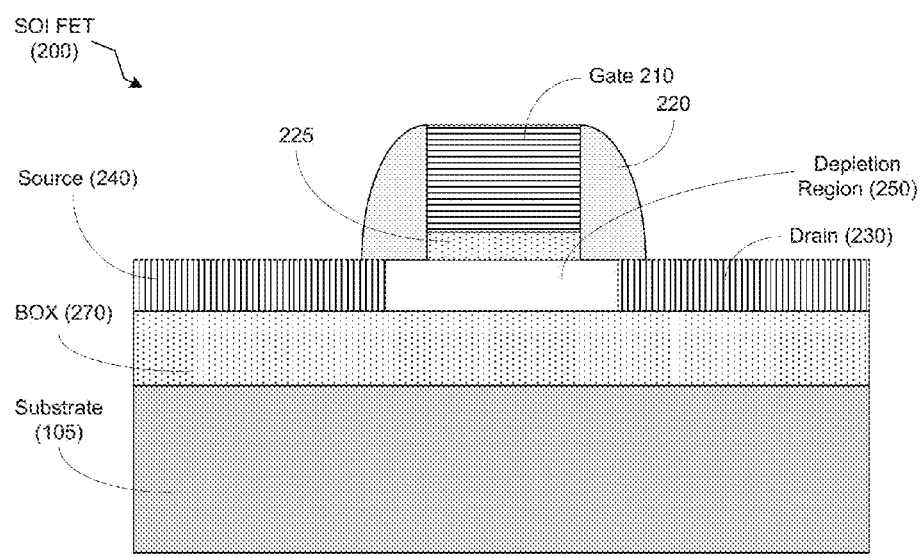
FIG. 2 illustrates a stylized depiction of a typical fully depleted (FD) SOI FET formed on a semiconductor wafer.
Figure 3:
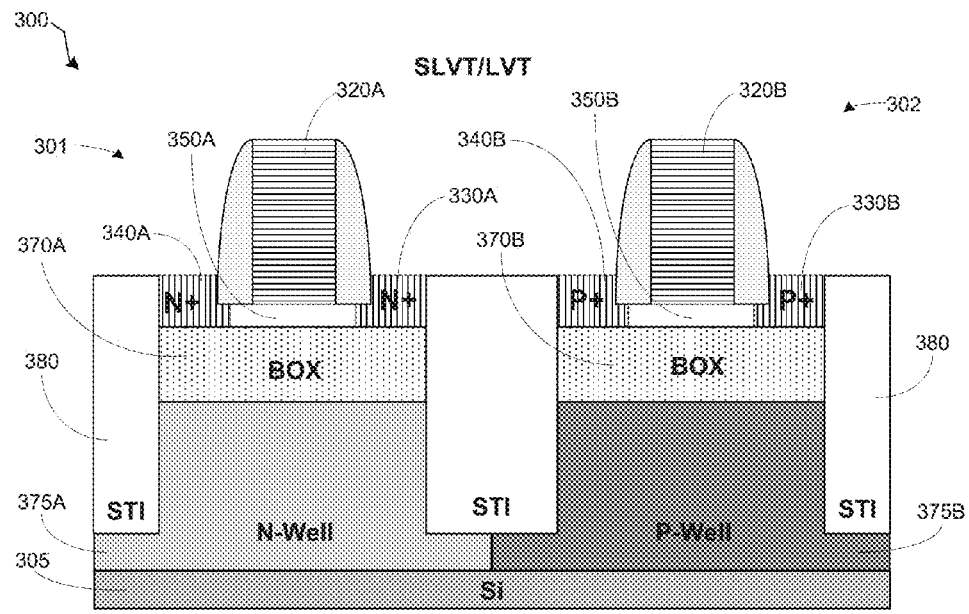
FIG. 3 illustrates a stylized depiction a typical transistor pair 400 formed in a LVT/SLVT configuration.
Figure 4:
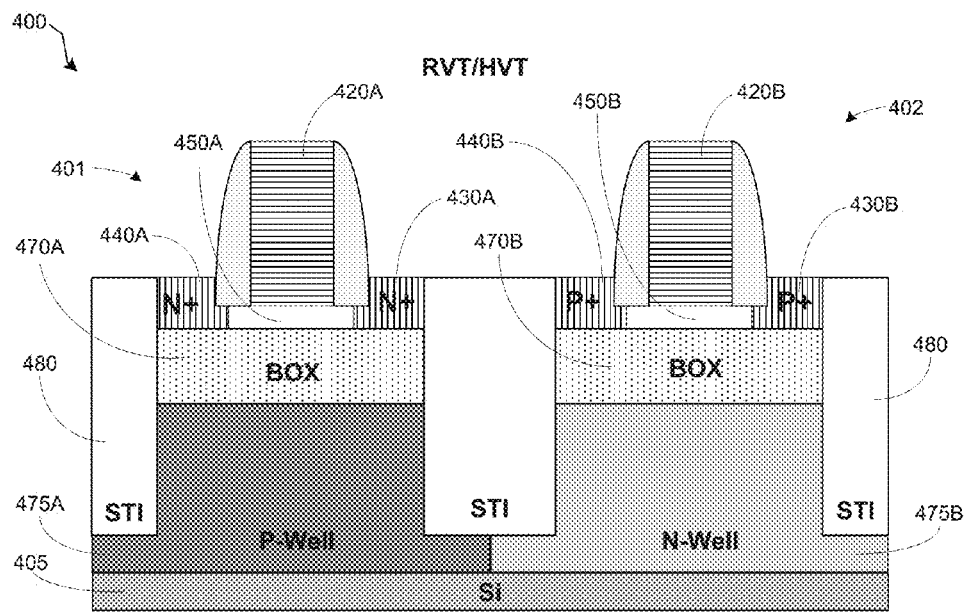
FIG. 4 illustrates a stylized depiction of typical transistor pair 500 formed in an RVT/HVT configuration.
Figure 5:
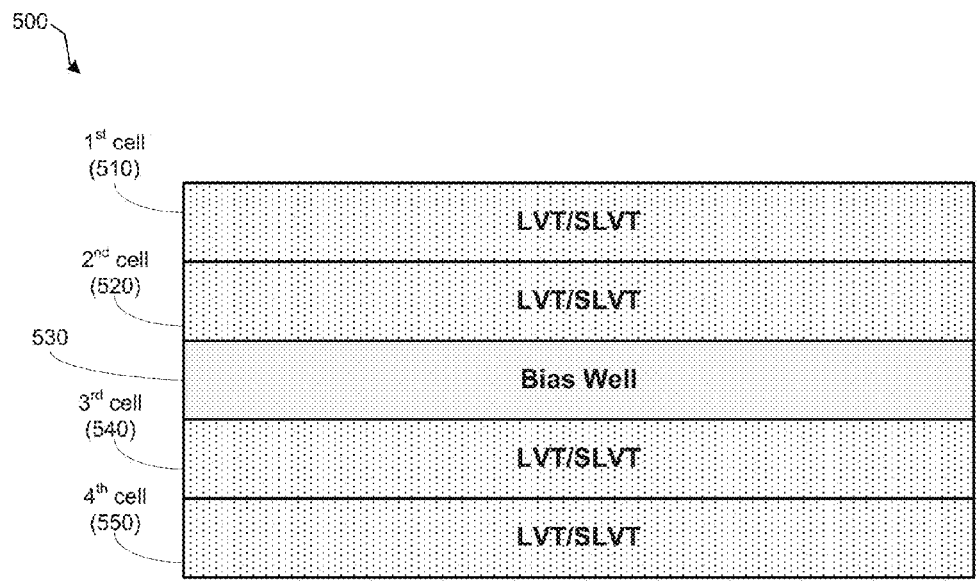
FIG. 5 illustrates a typical block of cells comprising a bias well.
Figure 6:
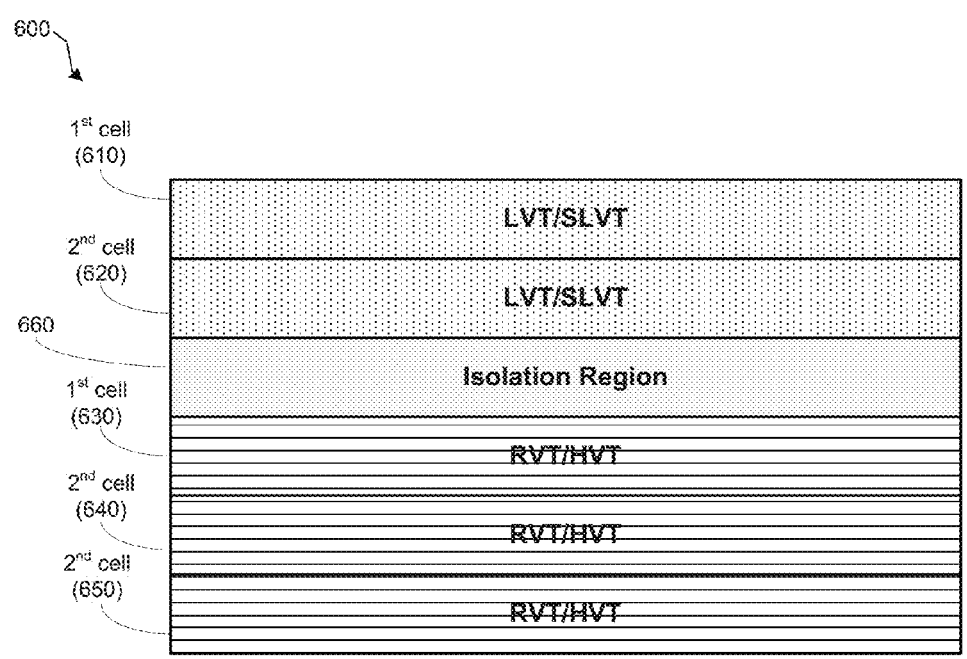
FIG. 6 illustrates a typical block of functional cells comprising an isolation spacing.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Semiconductor functional cells may be used to design and provide layouts for fabricating integrated circuit devices. In many embodiments, the functional cells may be pre-defined and stored in a library. Embodiments herein provide for forming semiconductor devices using hybrid design using functional cells. The functional cells of embodiments herein may comprise NMOS and/or PMOS devices, such as FD SOI transistors, e.g., 22 FDSOI transistors. In some embodiments, the hybrid design may comprise SLVT/LVT devices as well as HVT/RVT devices.

Embodiments herein provide for arranging standard cells of different tracks (e.g., 8-track [8T], 9-track [9T], 10-track [10T], 11-track [11T], etc.) such that the inherent spacing between the different size cells provide a bias well space for routing a biasing signal for biasing transistors in the cells. In this manner, targeted biasing of devices may be biased with higher granularity than block level (e.g., row or cell level biasing).

In other embodiments, standard cells of different tracks may be arranged such that the inherent spacing between the different size cells provide isolation spacing for providing for arranging different types of transistors (e.g., SLVT/LVT and HVT/RVT devices) in an adjacent fashion, which would not be possible without the isolation spacing. In this manner, a hybrid block comprising different types of transistors (e.g., SLVT/LVT and HVT/RVT devices) may be formed.

Figure 7:
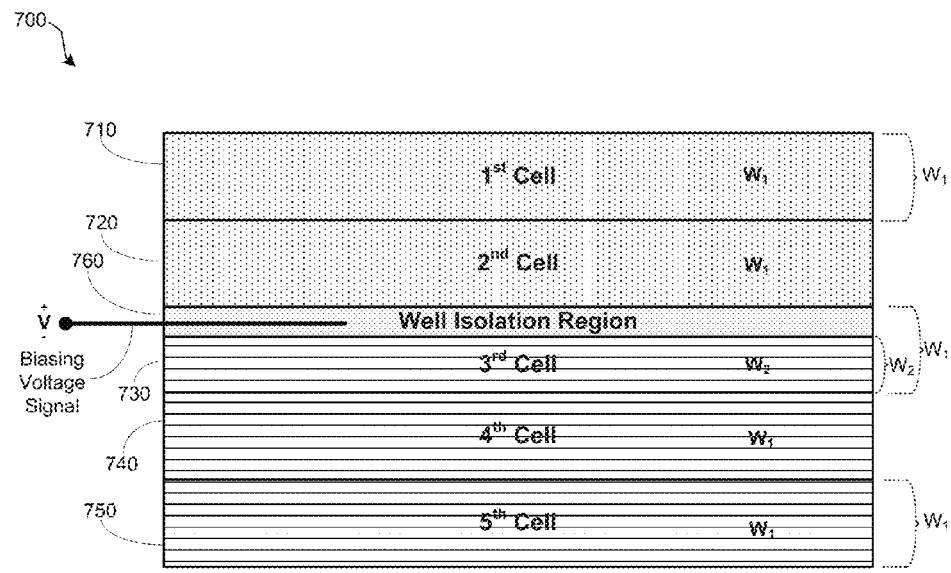
FIG. 7 illustrates a stylized block diagram depiction of a hybrid functional cell block comprising a bias well, in accordance with a first embodiment.

Turning now to FIG. 7 a stylized, block diagram depiction of a hybrid functional cell block comprising a bias well, in accordance with a first embodiment, is illustrated. A block 700 may comprise a plurality of functional cells, each of which may comprise a plurality of FD SOI devices. For example, the block 700 may comprise a 1$^{st}$ cell 710, a 2$^{nd}$ cell 720, a 3$^{rd}$ cell 730, a 4$^{th}$ cell 740, and a 5$^{th}$ cell 750. The 1$^{st}$ through 4$^{th}$ cells 710-740 are of a first track width, $W_1$ (e.g., 9 tracks cells [9T]). The 5$^{th}$ cell 750 is of a second track width, $W_2$ (e.g., 8 tracks cell [8T]), which is smaller than the first width, $W_1$. In one embodiment, $W_1$ may be of m-track width (e.g., m equals to 9, 10, or 11) and $W_2$ may be of (m−1)-track width or (m−2)-track width.

In one embodiment, the 2$^{nd}$ cell 720 may comprise devices that are targeted to be biased. For example, the devices in the 2$^{nd}$ cell 720 may be directed to data paths or interface circuit that are to be forward biased in the case of LVT/SLVT devices, or reverse biased in the case of RVT/HVT devices. The 5$^{th}$ cell 750 may be positioned within the block in such a manner that that a well isolation region 760 is created in the block 700. The size of the well isolation regions is the amount of track width that is equal to the difference in track widths between the 2$^{nd}$ cell 720 and 5$^{th}$ cell 750 (as shown in Equation 1).

$$\text{Well Isolation Region} = W_2 - W_1 \quad \text{Equation 1}$$

The well isolation region 760 provides an electrically isolated region in which a biasing signal may be routed. This biasing signal may be directed to provide a forward biasing or a reverse biasing catalyst.

In one embodiment, the term "hybrid" design may refer to utilizing functional cells of different track widths being utilized in a block, such as block 700. In this manner, using standard cells of different widths, a targeted well isolation region may be formed in a block for providing targeted biasing of transistors.

Moreover, due to the presence of the well isolation region 760 in block 700, the 2$^{nd}$ cell 720 may be comprised of a different devices type (e.g., LVT/SLVT devices or RVT/HVT device), as compared to device type of the 5$^{th}$ cell 750. Accordingly, in an alternative embodiment, the term "hybrid" design may refer to using functional cells of different device types (e.g., LVT/SLVT devices versus RVT/HVT device) within a group or block of functional cells. This alternative embodiment is described in further details in FIGS. 8 and 9, and accompanying descriptions below. In yet another embodiment, the term "hybrid" design may refer to a device design that comprises both the multiple track width functional cells, as well as functional cells of different device types.

Figure 8:
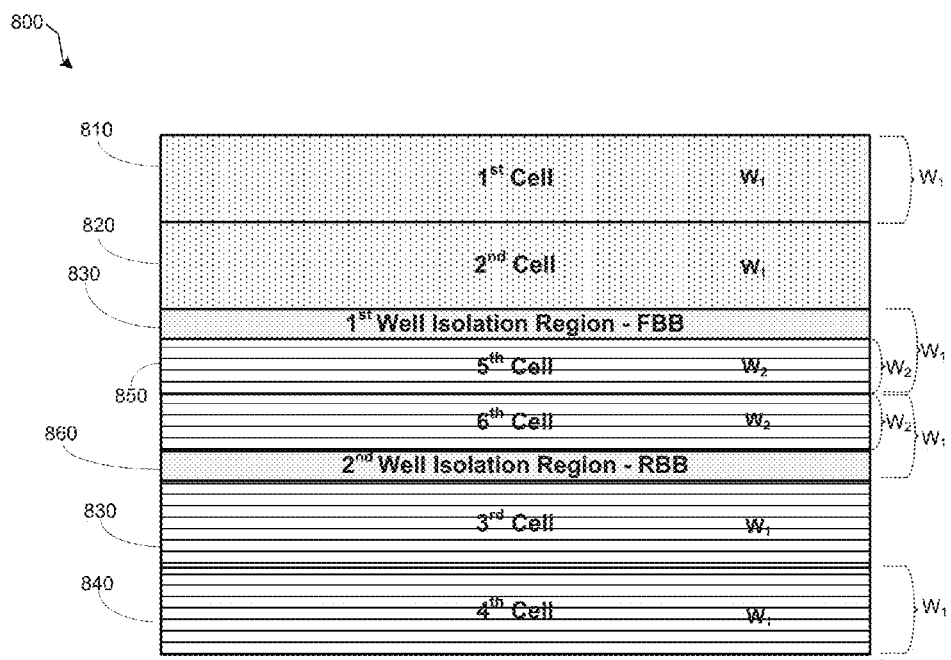
FIG. 8 illustrates a stylized block diagram depiction of a hybrid functional cell block comprising a plurality of bias wells, in accordance with a second embodiment.

Turning now to FIG. 8, a stylized block diagram depiction of a hybrid functional cell block comprising a plurality of bias wells, in accordance with a second embodiment is illustrated. A block 800 may comprise a plurality of functional cells, each of which may comprise a plurality of FD SOI devices. For example, the block 800 may comprise a 1$^{st}$ cell 810, a 2$^{nd}$ cell 820, a 3$^{rd}$ cell 830, a 4$^{th}$ cell 840, a 5$^{th}$ cell 850, and a 6$^{th}$ cell 860. The 1$^{st}$ through 4$^{th}$ cells 810-840 are of first track width, $W_1$ (e.g., 9T or 10T). The 5$^{th}$ and 6$^{th}$ cells 850, 860, are of a second track width, $W_2$ (e.g., 8T), which is smaller than the first track width, $W_1$. In an alternative embodiment, the 5$^{th}$ cell 850 may differ in track width from and 6$^{th}$ cell 860 and the other cells.

In one embodiment, the 2$^{nd}$ cell 820 may comprise LVT/SLVT devices that are targeted to be forward biased. For example, the devices in the 2$^{nd}$ cell 720 may be directed to data paths or interface circuits that are to be forward biased. Similarly, the 3$^{rd}$ cell 830 may comprise RVT/HVT devices that are targeted to be reversed biased. The cells being targeted for biasing may be biased to reduce timing errors, improve performance, or a combination thereof.

The 5$^{th}$ cell 750 may be positioned within the block 800, adjacent the 2$^{nd}$ cell 820 in such a manner that a 1$^{st}$ well isolation region 870 is created in the block 800. The 1$^{st}$ well isolation region 870 provides an electrically isolated region in which a forward biasing signal may be routed. The 6$^{th}$ cell 860 may be positioned within the block 800, adjacent the 3$^{rd}$ cell 830 in such a manner that that a 2$^{nd}$ well isolation region 880 is created in the block 800. The 2$^{nd}$ well isolation region 880 provides an electrically isolated region in which a reverse biasing signal may be routed to the 3$^{rd}$ cell 830. Therefore, in the example of FIG. 8, the 1$^{st}$ and 2$^{nd}$ cells 810, 820 comprise LVT/SLVT devices while the 3$^{rd}$ through 6$^{th}$ cells comprise RVT/HVT devices. In this manner, using standard cells in a circuit layout, built-in biasing channels may be formed within a group or block of functional cells.

Figure 9:
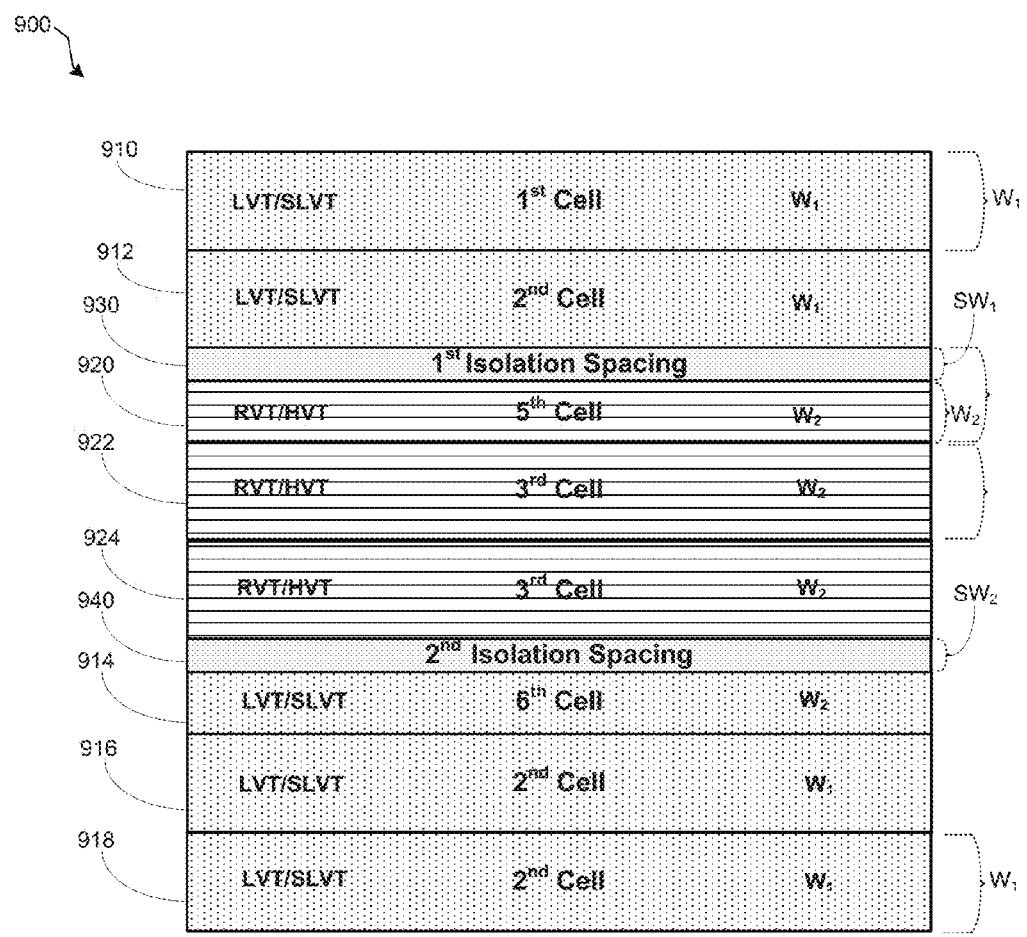
FIG. 9 illustrates a stylized block diagram of a hybrid design block comprising isolation spacing regions, in accordance with embodiments herein.

Turning now to FIG. 9, a stylized block diagram of a hybrid design block comprising isolation spacing regions, in accordance with embodiments herein, is illustrated. A block 900 may comprise a plurality of functional cells, each of which may comprise a plurality of FD SOI devices. For example, the block 900 may comprise a 1$^{st}$ cell 910, a 2$^{nd}$ cell 912, a 3$^{rd}$ cell 914, a 4$^{th}$ cell 916, a 5$^{th}$ cell 918, a 6$^{th}$ cell 920, a 7$^{th}$ cell 922, and an 8$^{th}$ cell 924. The 3$^{rd}$ and 6$^{th}$ cells 914, 920 are of second track width, $W_2$ (e.g., 8T), while all other cells are of a first track width, $W_1$ (e.g., 9T or 10T).

Moreover, some of the functional cells of the block 900 may be comprised of LVT/SLVT devices, while other functional cells may be comprised of RVT/HVT devices. As known to those skilled in the art, the LVT/SLVT cells cannot be arranged adjacent to the RVT/HVT cells without having sufficient isolation spacing. However, inserting isolation spacing may be inefficient and costly in terms of area resources. Embodiments herein provide for inserting functional cells of a smaller track width and using the difference between the track width dimensions to insert a "built-in" isolation spacing to allow for hybrid functional cell blocks.

In one embodiment, the 6$^{th}$ cell 920 may be an RVT/HVT cell that is of a smaller track width ($W_2$) that is placed adjacent the 2$^{nd}$ cell 912, which may be an LVT/SLVT cell that is of a larger track width ($W_1$). The difference between the first and second track widths is equal to the first spacer width ($SW_1$), as shown in Equation 2. The first spacer width, $SW_1$ is of a dimension that provides sufficient isolation between two types of functional cells.

$$\text{Spacer Width}(SW_1) = W_2 - W_1 \quad \text{Equation 2}$$

Further, the 3$^{rd}$ cell 920 may be an LVT/SLVT cell that is of a smaller track width ($W_2$) and is placed adjacent the 2$^{nd}$ cell 912, which may be an RVT/HVT cell that is of a larger track width ($W_1$). The difference between the first and second track widths is equal to the second spacer width ($SW_2$), which in one embodiment is equal to $SW_1$, and in an alternative embodiment, is of a different value. The second spacer width, $SW_2$ is also of a dimension that provides sufficient isolation between two types of functional cells. In this manner, a block 900 of function cells that comprises a plurality of device-types of FD SOI devices may be formed adjacent to each other using inherent track spacing that become available by using cells of track widths of different track widths. Further, in some embodiments, the spacer widths $SW_1$ and $SW_2$ are of sufficient dimension to allow for routing biasing voltage signals for forward biasing the $3^{rd}$ cell 914 and reverse biasing the $6^{th}$ cell 922.

Figure 10:
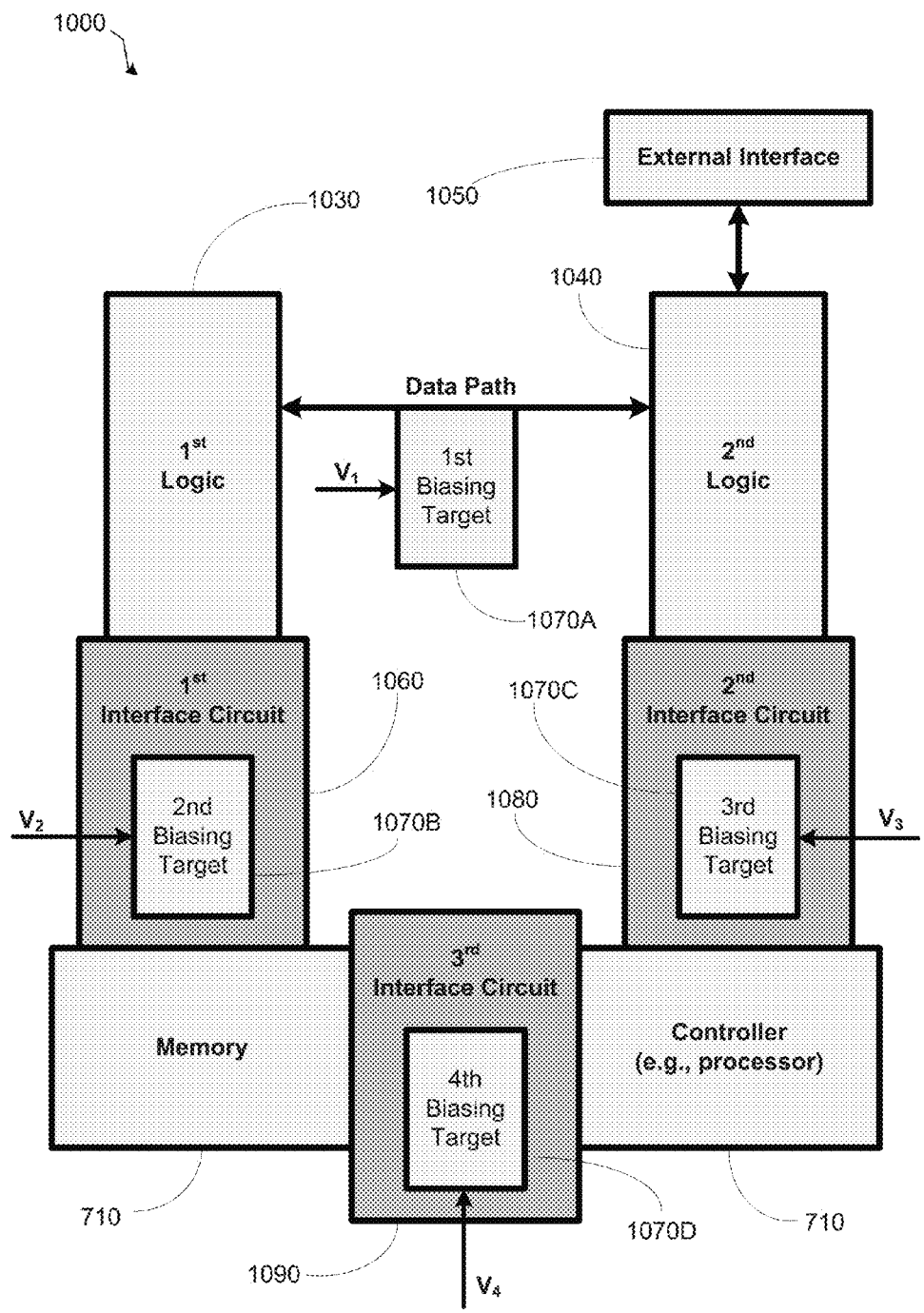
FIG. 10 illustrates a stylized block diagram depiction of a semiconductor device comprising bias circuit targets, in accordance with embodiments herein.

Turning now to FIG. 10, a stylized block diagram depiction of a semiconductor device 1000 comprising bias circuit targets, in accordance with embodiments herein, is illustrated. In one embodiment, the device 1000 may comprise controller 1010 (e.g., a processor), a memory 1020, a $1^{st}$ logic circuit 1030, a $2^{nd}$ logic circuit 1050, and an external interface 1050. In one embodiment, the device 1000 may be a single semiconductor chip. In other embodiments, the device 1000 may be a printed circuit (PC) board. In yet other embodiments, the device 1000 may be a standalone device. Those skilled in the art would appreciate that the device 1000 may comprise a subset of the circuit portions illustrated, or additional circuit portions, such as voltage supply, memory controller, etc.

The external interface 1050 allows for communications between the device 1000 and external devices. In one embodiment, the $2^{nd}$ logic 1040 directs such communications. Additionally, the device 1000 may comprise various interface circuits between the logic blocks 1030, 1040, memory 1020, and the controller 1010. For example, in the data path between the $1^{st}$ and $2^{nd}$ logic blocks 1030, 1040 may comprise a circuit that is a potential target for biasing a portion therein. This portion may be a row of a block of functional cells. This portion is labeled "$1^{st}$ biasing target 1070A" in FIG. 10. The $1^{st}$ biasing target 1070A may comprise a block of functional cells that comprises an isolation or biasing well as described in FIGS. 7-9. A bias voltage signal, $V_1$ may be provided to the $1^{st}$ biasing target 1070A for high-granularity (e.g., row-level) biasing. In this manner a targeted forward and/or reverse biasing of specific FD SOI transistor or set of transistors in the data path may be performed.

A $1^{st}$ interface circuit 1060 may provide for communications between the memory 1020 and the $1^{st}$ logic 1030. The $1^{st}$ interface circuit 1060 may comprise a circuit that is a potential target for biasing a portion therein. This portion may be a row of a block of functional cells. This portion is labeled as "$2^{nd}$ biasing target 1070B" in FIG. 10. The $2^{nd}$ biasing target 1070B may comprise a block of functional cells that comprises an isolation or biasing well as described in FIGS. 7-9. A bias voltage signal, $V_2$ may be provided to the $2^{nd}$ biasing target 1070B. In this manner a targeted forward and/or reverse biasing of specific FD SOI transistor or set of transistors in the $1^{st}$ interface circuit 1060 may be performed.

A $2^{nd}$ interface circuit 1080 may provide communications between the controller 1040 and the $2^{nd}$ logic 1030. The $2^{nd}$ interface circuit 1080 may comprise a circuit that is a potential target for biasing a portion therein. This portion may be a row of a block of functional cells. This portion is labeled as "$3^{rd}$ biasing target 1070C" in FIG. 10. The $3^{rd}$ biasing target 1070C may comprise a block of functional cells that comprises an isolation or biasing well as described in FIGS. 7-9. A bias voltage signal, $V_3$ may be provided to the $3^{rd}$ biasing target 1070C. In this manner a targeted forward and/or reverse biasing of specific FD SOI transistor or set of transistors in the $3^{rd}$ interface circuit 1080 may be performed.

Similarly a $3^{rd}$ interface circuit 1090 may provide communications between the controller 1040 and the memory 1020. The $3^{rd}$ interface circuit 1080 may comprise a circuit that is a potential target for biasing a portion therein. This portion may be a row of a block of functional cells. This portion is labeled as "$4^{th}$ biasing target 1070D" in FIG. 10. The $4^{th}$ biasing target 1070D may comprise a block of functional cells that comprises an isolation or biasing well as described in FIGS. 7-9. A bias voltage signal, $V_4$ may be provided to the $4^{th}$ biasing target 1070D. In this manner, a targeted forward and/or reverse biasing of specific FD SOI transistor or set of transistors in the $4^{th}$ interface circuit 1090 may be performed. As noted above, the biasing targets 1070A-D may provide for timing corrections as well as performance enhancements using forward and/or reverse biasing.

In an alternative embodiment, the bias voltage targets of FIG. 10 may refer to circuit portions in which the usage for hybrid functional cell blocks (e.g., blocks comprising LVT/SLVT cells and RVT/HVT cells) may be desired. This usage of hybrid functional cell blocks may be desired for applying forward and/or reverse biasing to certain circuit portions, and/or for other performance/operation enhancements.

The biasing targets 1070A-D may be used to bias a set of transistors to adjust the operation speed of the various circuits described above. These adjustments may be made to reduce timing violations, increase performance, and/or compensate for PVT issues.

Those skilled in the art having benefit of the present disclosure would appreciate that the circuit illustrated in FIG. 10 is provided as an example for implementing embodiments herein. For example, the circuit 1000 may comprise a subset of the circuit components illustrated in FIG. 10, or may comprise additional circuitry. Embodiments herein may be implemented in a variety of circuits and remain within the spirit and scope of embodiments and claims herein.

Figure 11:
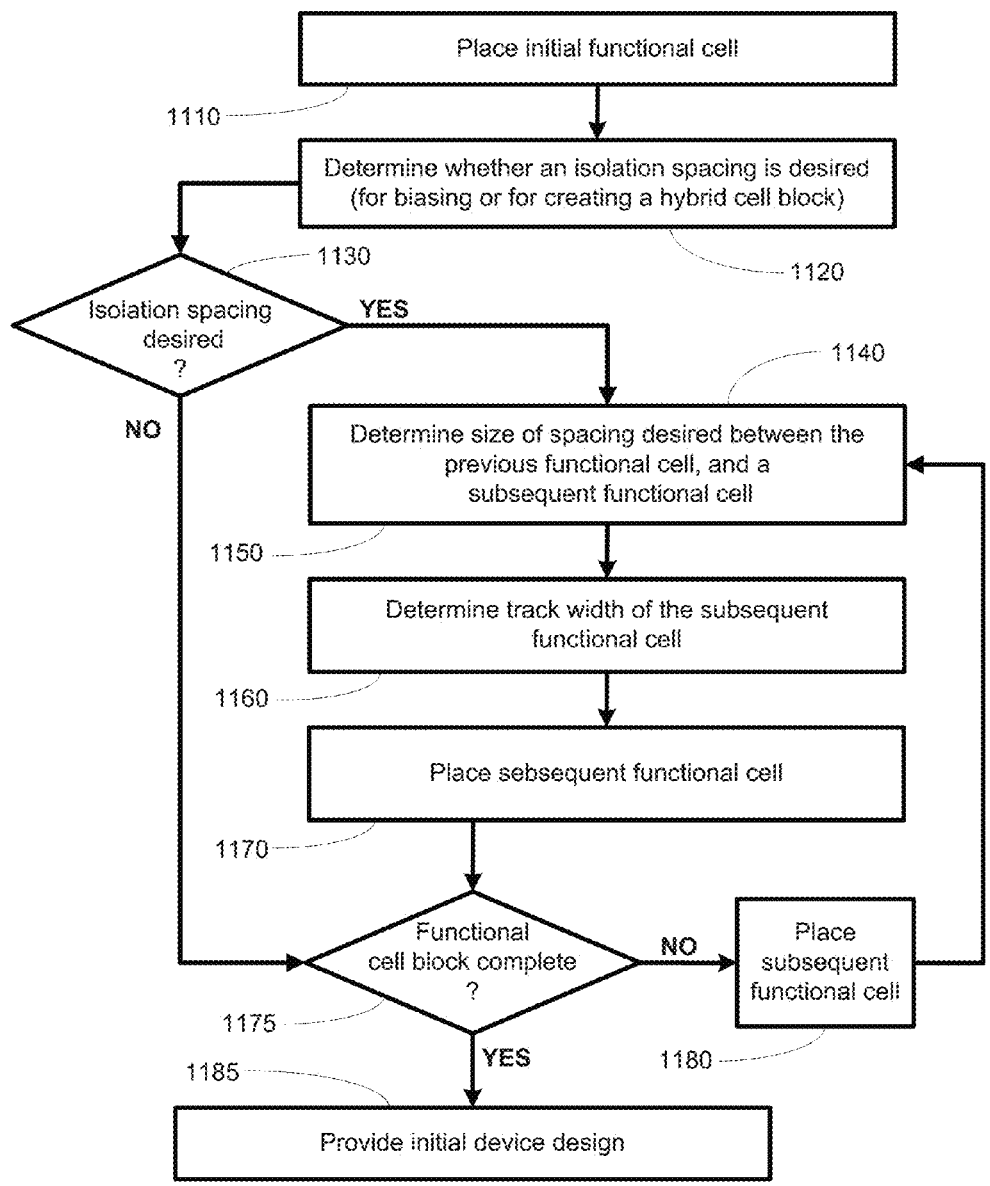
FIG. 11 illustrates a flowchart depiction of a process for providing a hybrid functional cell block comprising FD SOI devices, in accordance with embodiments herein.

Turning now to FIG. 11, a flowchart depiction of a process for providing a hybrid functional cell block comprising FD SOI devices, in accordance with embodiments herein is illustrated. An initial functional cell is placed in a circuit layout in a functional cell block for providing a semiconductor device design (at block 1110). This process may represent circuitry intended to be placed on a semiconductor substrate. A determination is then made whether an isolation spacing is desired (at blocks 1120, 1130). In one embodiment, the isolation space may be provided to route biasing voltage signals without utilizing additional space in the functional cell block. In another embodiment, the isolation space may be provided to accommodate placement of different device-types of FD SOI devices (e.g., LVT/SLVT and RVT/HVT devices) within the functional cell block.

The size of the isolation space is determined (at block 1140). For example, if a substantial biasing voltage signal is required to be placed between the rows of the functional cell block, then a wider isolation spacing (e.g., two-track spacing instead of one-track spacing) may be required. As another example, if a substantial sized cell of a different type of FD SOI device is to be placed adjacent to the initial cell, then a wider isolation spacing may be desired.

Based upon the size of the spacing desired, a track width of the subsequent functional cell is determined (at block 1160). For example, in one embodiment, the initial cell track width may be 10T. If a normal isolation spacing is required, the track width of the subsequent cell may be 9T. However, if a larger isolation spacing is required, the track width of the subsequent cell may be 8T, thereby providing a built-in 2T track width to provide isolation for biasing signal and/or isolation for adjacently placing a different device-type of FD SOI device cell. Based upon the determination of the track width of the subsequent functional cell, this cell is placed adjacent the initial functional cell (at block 1170).

A determination is then made as to whether the functional cell block is complete (at block 1175). If the functional cell block is not complete, then a subsequent functional cell is placed (at block 1180) and the process of determining isolation spacing for subsequent placement of cells of blocks 1120-1175 may be repeated until the functional cell block is complete. When the functional cell block is complete, an initial device design is provided (at block 1185). In some embodiments, further analysis of the initial device design may be performed to further refine the semiconductor device design, as exemplified in FIG. 12. In another embodiment, the steps described in FIG. 11 may be used to place functional cells on a circuit layout of a semiconductor wafer to form a semiconductor device.

Figure 12:
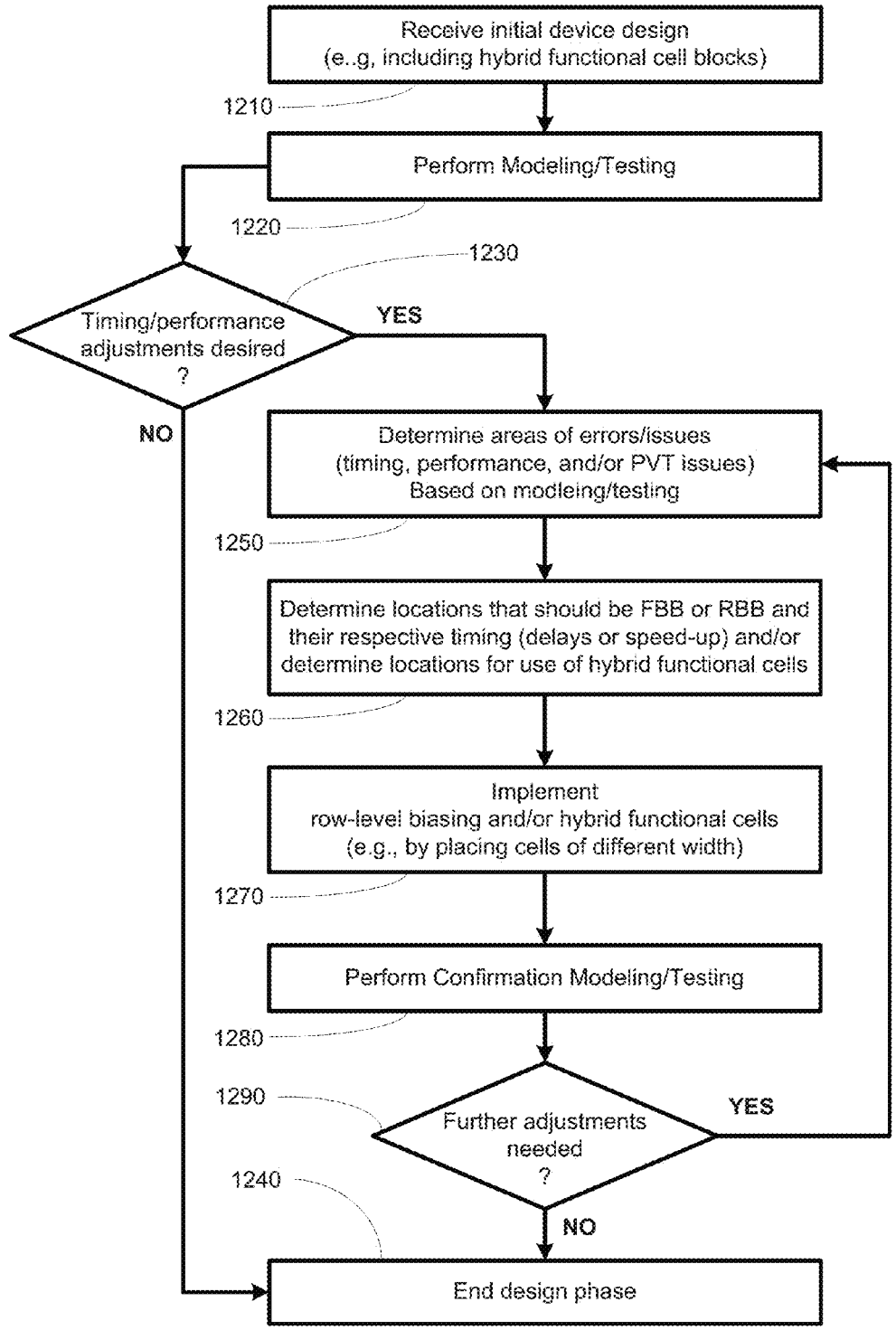
FIG. 12 illustrates a flowchart depiction of a process for providing forward and/or reverse biasing for FD SOI devices, in accordance with embodiments herein.

Turning now to FIG. 12, a flowchart depiction of a process for providing forward and/or reverse biasing for FD SOI devices, in accordance with embodiments herein is provided. An initial device design that may comprise hybrid functional cell blocks is provided or received by a semiconductor processing system (at block 1105). For example, the hybrid functional cell blocks may comprise some functional cells comprising LVT/SLVT devices and other cells comprising RVT/HVT devices. In other embodiments, the initial device design may comprise a set of homogenous FD SOI devices that may comprise circuit locations that may be biased to enhance performance and/or adjust operation timing.

In one embodiment, based upon the initial device design of a semiconductor device comprising FD SOI devices, a modeling and/or testing of that design is performed (at block 1210). A determination is made whether timing or performance adjustments are desired based upon the modeling/testing function (at block 1220). In the event that timing or performance adjustments are not desired, the design phase may be terminated (at block 1230).

However, if a determination is made that timing or performance adjustments are desired, one or more areas of potential error (e.g., timing failures, performance below predetermined threshold levels, PVT issues, etc.) may be determined (at block 1240). This determination may be made by analyzing the modeling/testing data, performing further modeling/testing, and/or selecting circuit areas that are generally known to have timing or performance issues, such as interface regions between two major circuit components (e.g., one or more of the biasing targets of FIG. 10). In one embodiment, this determination may include determining a circuit area in which an operation speed is be increased or decreased, or determining a circuit area in which a functionality can be restored to at least one of a pre-silicon tuning or a post-silicon tuning at a wider operating condition (e.g., expanded voltage level window, temperature conditions, etc.).

Based upon determining circuit areas that may have timing, performance issues, and/or PVT issues, a determination may be made as to areas that should be forward biased and/or areas that should be reversed biased (at block 1250). This includes identifying a particular transistor or sets of transistors that are LVT/SLVT configured for forward biasing and/or identifying a particular transistor or sets of transistors that are RVT/HVT configured for reverse biasing.

Upon determining the areas of potential timing, performance, and/or PVT issues, a determination is made as to specific locations (e.g., with row level granularity) that should be forward or reversed biased, and/or a determination is made as to the specific location for implementing hybrid function cells (at block 1260). Upon these determinations, routing for high-granularity biasing (e.g., row-level biasing), and/or implementation of hybrid functional cell blocks may be performed using the multi-track width cell design described herein (at block 1260)

In this manner, certain interface regions or data paths may be sped up or slowed down in order to adjust for timing, performance, and/or PVT issues. Further, performance of the device design may be improved by using hybrid functional cell blocks. The steps described in blocks 1240-1260 may be considered to be an optimizing function for optimizing the performance of the semiconductor device under design.

Upon designing in the biasing and hybrid cell blocks described in the context of block 1260, in one embodiment, a further confirmation modeling/testing process may be performed (at block 1270). This modeling/testing process may be more limited to modeling and/or testing specific areas that have been altered in the context of blocks 1240-1260. A determination is made whether further adjustments to the timing or performance of the semiconductor device is required as a result of the confirmation modeling/testing (at block 1280). If a determination is made that further adjustments are required, the optimizing functions (at blocks 1240-1260) may be repeated. If a determination that further adjustments are not required, the design phase may be terminated (at block 1230). The steps described in FIGS. 11 and 12 may be performed automatically by a process control system, similar to the system described below in FIG. 13.

Figure 13:
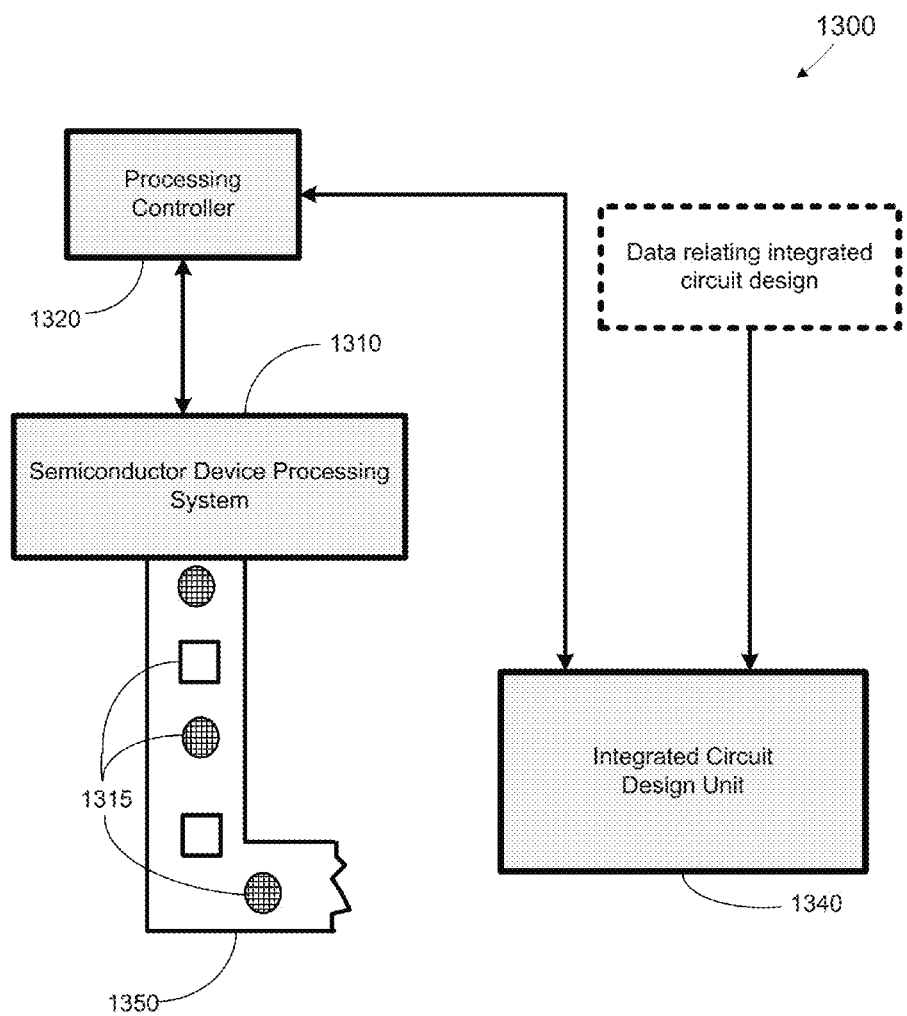
FIG. 13 illustrates a stylized depiction of a system for fabricating a semiconductor substrate on which FD SOI PMOS and NMOS devices may be formed, in accordance with some embodiments herein.

Turning now to FIG. 13, a stylized depiction of the semiconductor device system capable of designing and manufacturing semiconductor devices in accordance with embodiments herein, is illustrated. The semiconductor device processing system 1310 may comprise various processing stations, such as etch process stations, photolithography process stations, CMP process stations, etc. One or more of the processing steps performed by the processing system 1310 may be controlled by the processing controller 1320. The processing controller 1320 may be a workstation computer, a desktop computer, a laptop computer, a tablet computer, or any other type of computing device comprising one or more software products that are capable of controlling processes, receiving process feedback, receiving test results data, performing learning cycle adjustments, performing process adjustments, etc.

The semiconductor device processing system 1310 may produce integrated circuits on a medium, such as silicon wafers. The production of integrated circuits by the device processing system 1310 may be based upon the circuit designs provided by the integrated circuits design unit 1340. The processing system 1310 may provide processed integrated circuits/devices 1315 on a transport mechanism 1350, such as a conveyor system. In some embodiments, the conveyor system may be sophisticated clean room transport systems that are capable of transporting semiconductor wafers. In one embodiment, the semiconductor device processing system 1310 may comprise a plurality of processing steps, e.g., the $1^{st}$ process step, the $2^{nd}$ process set, etc., as described above. Further, the device processing system 1310 may comprise metrology tools for providing metrology data for test/modeling analysis.

In some embodiments, the items labeled "1315" may represent individual wafers, and in other embodiments, the items 1315 may represent a group of semiconductor wafers, e.g., a "lot" of semiconductor wafers. The integrated circuit or device 1315 may be a transistor, a capacitor, a resistor, a memory cell, a processor, and/or the like. In one embodiment, the device 1315 is a transistor and the dielectric layer is a gate insulation layer for the transistor.

The integrated circuit design unit 1340 of the system 1300 is capable of providing a circuit design that may be manufactured by the semiconductor processing system 1310. The design unit 1340 may receive data relating to the design specifications for the integrated circuits to be designed. The integrated circuit design unit 1340 is capable of providing an initial semiconductor circuit design that comprises at least two functional cells of different track widths. Further the integrated circuit design unit 1340 is capable of generating a group or block of functional cells of different transistor types (e.g., LVT/SLVT device types and RVT/HVT device types).

In one embodiment, the integrated circuit design unit 1340 may perform a modeling of a device design and/or testing of processed semiconductor device design to test the performance and operation of the design. This includes determining whether certain regions of the design or device should be provided with forward or reverse biasing and timing adjustments, as described above. The integrated circuit design unit 1340 is capable of analyzing and performing design adjustments to provide, route, and implement forward and/or reverse biasing voltages. The design adjustments described in FIG. 12 may be automatically performed by the system 1300. In some embodiments, test data from the testing of semiconductor devices may be used by the integrated circuit design unit 1340 to modify subsequent device designs.

In other embodiments, the integrated circuit design unit 1340 may perform an automated determination of area that require design adjustments to provide, route, and implement forward and/or reverse biasing voltages and timing adjustments, and automatically incorporate design adjustments into the device design. For example, once a designer or a user of the integrated circuit design unit 1340 generates a design using a graphical user interface to communicate with the integrated circuit design unit 1340, the unit 1340 may perform automated modification of the design.

The system 1300 may be capable of performing analysis and manufacturing of various products involving various technologies. For example, the system 1300 may design and production data for manufacturing devices of CMOS technology, Flash technology, BiCMOS technology, power devices, controllers, processors, memory devices (e.g., DRAM devices), NAND memory devices, and/or various other semiconductor technologies.

Although in some examples, circuits herein were described in terms of FD SOI devices for consistency and ease of illustration, those skilled in the art would appreciate that concepts described herein may also apply to other SOI devices (e.g., partially depleted (PD) SOI devices) and remain within the scope of embodiments herein. The concepts and embodiments described herein may apply to a plurality of types of VT families of devices, including but limited to, FD SOI LVT transistors, FD SOI SLVT transistors, FD SOI RVT transistor, FD SOI HVT transistors, or a combination herein, and remain within the scope of the embodiments herein. The concepts and embodiments herein may be applied to any VT family of transistors in the technology described above (e.g., if ULVt or UHVt is generated).

The system 1300 may be capable of manufacturing and testing various products that include transistors with active and inactive gates involving various technologies. For example, the system 1300 may provide for manufacturing and testing products relating to CMOS technology, flash technology, BiCMOS technology, power devices, memory devices (e.g., DRAM devices), NAND memory devices, processors, and/or various other semiconductor technologies.

The methods described above may be governed by instructions that are stored in a non-transitory computer readable storage medium and that are executed by, e.g., a processor in a computing device. Each of the operations described herein (e.g., FIGS. 10, 11 and 12) may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   placing a first functional cell having a first width on a circuit layout;
   determining whether at least one transistor of said first functional cell is to be forward biased or reversed biased;
   placing a second functional cell having a second width adjacent to said first functional cell on said circuit layout for providing a first biasing well within the total width of said first and second functional cells in response to determining that said at least one transistor is to be forward biased or reversed biased;
   placing a third functional cell having said first width adjacent said second functional cell;
   placing a fourth functional cell having said second width adjacent said third functional cell for providing a second biasing well within the total width of said first, second, third, and fourth functional cells; and
   processing a semiconductor wafer for forming a device comprising said first and second functional cells.

2. The method of claim 1, wherein:
   placing said first functional cell having a first width on a circuit layout comprises placing an m-track cell, wherein m is equal to at least one of 9, 10, or 11;
   placing said second functional cell having a second width comprises placing at least one of an (m−1)-track cell or an (m−2) cell.

3. The method of claim 1, wherein providing said first biasing well comprises providing an isolation region between said first functional cell and said second functional cell.

4. The method of claim 1, wherein providing said first biasing well within the total width of said first and second functional cells comprises arranging said first functional cell, said second functional cell, and said biasing well within two times the first width.

5. The method of claim 1, further comprising routing a first biasing voltage signal in said first biasing well.

6. The method of claim 1, wherein placing said first, second, third, and fourth functional cells comprises placing cells comprising at least one of FD SOI LVT transistors, FD SOI SLVT transistors, FD SOI RVT transistors, or FD SOI HVT transistors.

7. A method, comprising:
providing a device design comprising a hybrid functional cell block, wherein said hybrid functional cell block comprising a first device type cell and a second device type cell, wherein providing said device design comprises:
placing a first functional cell of said first device type in a circuit layout, wherein said first functional cell has a first width;
placing a second functional cell of said second device type adjacent said first functional cell, said second functional cell having a second width for providing an isolation channel between said first and second functional cells;
determining whether an isolation spacing should be formed for at least one of providing a biasing channel or creating an isolation channel for adjacently placing functional cells of different device types;
determining a size of at least one of said biasing channel or said isolation channel based on determining that said isolation spacing should be formed; and
determining the track width size of the second functional cell based upon said size; and
processing a semiconductor wafer for forming a device comprising said first and second functional cells.

8. The method of claim 7, wherein:
placing said first functional cell having a first width on said circuit layout comprises placing at least one of a 9-track cell, a 10-track cell, or a 11-track cell;
placing said second functional cell having a second width comprises placing a cell that has a second width of one track smaller than said first width, or two tracks smaller than said first width.

9. The method of claim 7, further comprising performing an operation modeling of said device design for determining whether said device design comprises at least one of a timing error or a performance error.

10. The method of claim 9, wherein performing said operation modeling comprises at least one of testing for timing errors, determining a design change for reducing timing errors, or determining a design change for improving a performance of said semiconductor device circuit design.

11. The method of claim 9, further comprising at least one of:
identifying a circuit area in which an operation speed is be increased or decreased; or
identifying a circuit area in which a functionality can be restored to at least one of a pre-silicon tuning or a post-silicon tuning at a wider operating condition.

12. The method of claim 7, further comprising forming said biasing channel adjacent said circuit area.

13. A semiconductor device, comprising:
a first functional cell having a first width;
a second functional cell having a second width adjacent to said first functional cell on said circuit layout for providing a first biasing well within the total width of said first and second functional cells;
a first biasing signal wire positioned in said first biasing well for providing at least one of forward biasing signal or a reverse biasing signal to at least one of said first functional cell or said second functional cell; and
a hybrid functional cell block, wherein said hybrid functional cell block comprising a first device type cell and a second device type cell, and wherein said hybrid functional cell block comprising a first functional cell of said first device type and a second functional cell of said second device type adjacent said first functional cell, said second functional cell having a second width for providing an isolation channel between said first and second functional cells within a dimension that is twice the first width.

14. The semiconductor device of claim 13, wherein said first and second functional cells is comprised of at least one of FD SOI transistors, FD SOI LVT transistors, FD SOI SLVT transistors, FD SOI RVT transistors, or FD SOI HVT transistors.

15. The semiconductor device of claim 13, wherein said biasing signal wire provides a signal for adjusting the operation timing of said at least a portion of said first functional cell or said second functional cell.

16. The semiconductor device of claim 13, further comprising
a processor;
a memory device;
an interface circuit for operatively coupled to said processor and said memory device, said interface circuit comprising said first biasing signal wire, said first functional cell, and second functional cell.

* * * * *